May 18, 1943  H. W. NEUNHERZ  2,319,254
HARDWARE
Filed Sept. 17, 1941
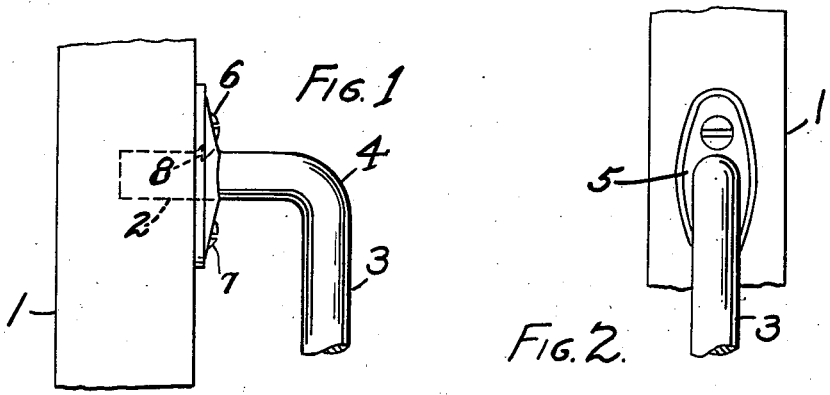
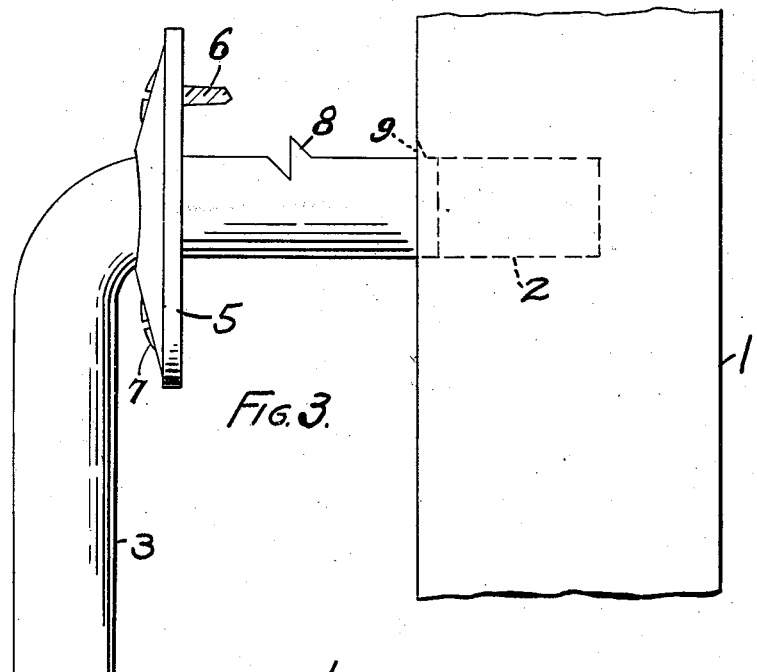
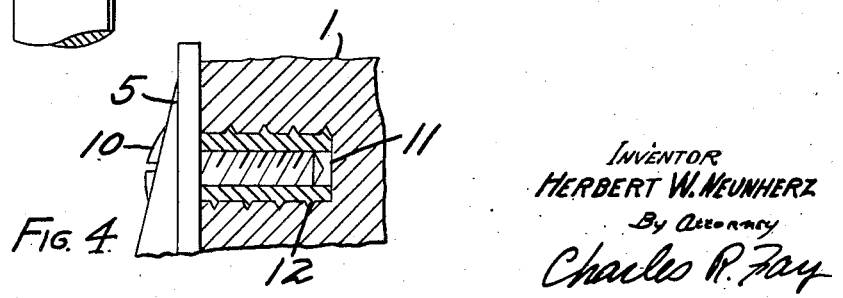
INVENTOR
HERBERT W. NEUNHERZ
By Attorney
Charles R. Fay

Patented May 18, 1943

2,319,254

UNITED STATES PATENT OFFICE 2,319,254

HARDWARE

Herbert W. Neunherz, Gardner, Mass.

Application September 17, 1941, Serial No. 411,190

6 Claims. (Cl. 287—20)

This invention relates to hardware and particularly to fittings for securing rods or the like to supporting members.

Objects of the present invention include the provision of an angled rod adapted for connection at one end adjacent the angle to a support, there being a plate surrounding the rod and adapted to carry a fastener, and a connection between the plate and the rod to prevent removal of the latter from the support after the former has been attached thereto, thereby avoiding any kind of a thru bolt or other fastening means extending all the way thru the support.

Other objects of the invention include the provision of a support having a closed bore for reception of the free end of a rod, there being a plate slidable on the rod and adapted to carry a single fastener for securing the plate to the support, and a projection on the rod adapted to abut the face of the plate adjacent the support whereby the rod is anchored, without thru fasteners, when the single fastener is inserted in the support, the projection being located to extend radially of the rod and in the direction of the fastener to obviate disadvantageous leverage on the fastener.

Other objects and advantages of the invention will appear hereinafter.

Reference is to be had to the accompanying drawing, in which

Fig. 1 is a view in side elevation of a fitting according to the present invention;

Fig. 2 is a front elevation of the fitting of Fig. 1;

Fig. 3 is an enlarged reverse side elevation of the fitting of Figs. 1 and 2 showing the parts separated and in position to be assembled; and Fig. 4 is an enlarged section thru a modified form of fastener.

The fitting comprising the present invention may be used in any relation where desired or convenient but is illustrated in the present instance as forming a hanger device or fitting for the support of a vertical rod such as is used for a guide rod for the drop side of an infant's crib.

Reference numeral 1 indicates a support of any kind, but here shown as a square sectional vertical post. A horizontal bore 2 is formed in one face of the post for reception of the free end of a rod 3, the latter being illustrated as having a right angle bend 4 therein, this bend being located adjacent the bored face of the post 1, but spaced therefrom when the rod is completely seated in the bore.

A generally elliptical plate 5 having a raised surface is apertured centrally to receive the rod and a screw or other fastener 6 is loosely mounted in the plate just above the upwardmost extent of the rod. This screw is turned into the post to secure the plate thereto. It will be noted that plate 5 is vertically arranged when in final position, this arrangement providing a harmonious effect with the rod 3 as will be seen from Fig. 2. The plate 5 could of course be turned 90° to a horizontal, but the effect would not be as pleasing to the eye and the plate would be too wide for a narrow post as here illustrated. In cases where there is no bend 4 in rod 3, plate 5 will naturally have to be located at right angles to the length of the rod, but should be parallel to the post.

The reference numeral 7 indicates a simulated fastener head which is formed directly in the metal of the plate, to balance the appearance of the head of fastener 6. In the form shown, the simulation 7 is located behind the rod, so that it would be extremely inconvenient to apply a turning up tool thereto, but in any case, only one actual fastener is needed to carry out the invention inasmuch as the plate 5 is not a support but merely a rod retaining means, the post itself supporting the rod.

A radial projection 8 is formed in the rod at its uppermost surface by upsetting or other process. This projection is located a distance from the end of the rod sufficient to seat into the material of the post 1 a short distance, as at 9, Fig. 3. In cases where the post is wooden, the projection will make its own seat, displacing the post material when the rod is entered in the bore, but if the post is made of metal, the seat will be milled out.

After seating the rod and its projection, the plate 5 is slid along the rod until it seats flatly against the post face, and the projection, and the fastener 6 is then applied, so that the rod cannot be withdrawn without first removing the plate.

Projection 8 will prevent any tendency of the rod to turn, and by placing it closely adjacent the fastener 6, no very great leverage can be exerted by which the plate or rod could be torn out. If the projection were at the opposite side of the rod, a considerable leverage could be imposed on the fastener by forces acting at the other end of the rod.

In some cases a machine screw fastener 10 will be found convenient, and if the post 1 is of metal this will present no difficulty. However, if the post is of wood, an interiorly screw threaded bushing 11 having exterior screw threads 12 may be located in an additional bore in the post. It is to be particularly noted that plate 5 is not a support but only a means to prevent rod removal, as most of the strain comes on the post direct from the rod. Also, simulated fastener 7 could be an actual fastener if desired or convenient.

Having thus described my invention and the advantages thereof, I do not wish to be limited to the details herein disclosed, otherwise than as set forth in the claims, but what I claim is:

1. In an article of the class described, the combination of a support and means forming a bore in said support; with a rod adapted to be partially entered in said bore, an integral radially extending projection on said rod, a plate loosely slidable on said rod, and a fastener in said plate for securement to said support, said projection being located to engage said plate at its side next adjacent the support.

2. In an article of the class described, the combination of a support, means forming a bore in said support, and means forming an indentation adjacent said bore in a surface of said support; with a rod to be entered in said bore, a projection on said rod fitting said indentation, a loose plate on said rod adapted to be secured to said support surface in a position wherein it may be engaged by said projection, and separate means securing said plate to the support.

3. In an article of the class described, the combination of a support, and a means forming a bore in said support; with a rod having an end enterable in said bore, a projection on said rod and spaced from said end a distance to enter the material of said support surrounding said bore when said rod end is entered therein, a loose plate adapted to be secured to said support in position to be engaged by said projection, and separate means securing the plate to the support.

4. In an article of the class described, the combination of a support, and means forming a bore in said support, with a rod having an end enterable in said bore, a radial projection on said rod spaced from said end a distance to engage the surface of the support adjacent the bore when said end is entered in the bore, a plate adapted to be secured to said surface, and means to so secure said plate, said means being spaced from said rod in the direction of said projection, the latter being adapted to engage the side of said plate next adjacent said support surface.

5. In an article of the class described, the combination of a support having a surface, and means forming a bore in said support extending inwardly thereof from said surface; with a rod having a bent portion, part of said portion being seated in said bore, a projection on said portion extending oppositely to the main extent of said rod, a plate associated with said rod and being secured to said surface in a position wherein the side of said plate next to said surface is engageable by said projection, whereby said plate fastens the rod to the support.

6. An article of the class described as recited in claim 5 wherein said plate has a fastener therethru, said fastener being spaced from said rod in the radial direction of said projection, and a simulated fastener on said plate diametrically opposite said first named fastener.

HERBERT W. NEUNHERZ.